(12) United States Patent
Köster

(10) Patent No.: US 11,548,572 B2
(45) Date of Patent: Jan. 10, 2023

(54) COUPLING SYSTEM

(71) Applicant: SAF-HOLLAND GmbH, Bessenbach (DE)

(72) Inventor: Mario Sebastian Köster, Bodman-Ludwigshafen (DE)

(73) Assignee: SAF-HOLLAND GmbH, Bessenbach (DE)

(*) Notice: Subject to any disclaimer, the term of this patent is extended or adjusted under 35 U.S.C. 154(b) by 248 days.

(21) Appl. No.: 16/981,140

(22) PCT Filed: Mar. 13, 2019

(86) PCT No.: PCT/EP2019/056292
§ 371 (c)(1),
(2) Date: Sep. 15, 2020

(87) PCT Pub. No.: WO2019/175246
PCT Pub. Date: Sep. 19, 2019

(65) Prior Publication Data
US 2021/0061375 A1    Mar. 4, 2021

(30) Foreign Application Priority Data
Mar. 15, 2018 (DE) ............. 10 2018 105 998.1

(51) Int. Cl.
*B62D 53/08* (2006.01)
*B60D 1/01* (2006.01)
(Continued)

(52) U.S. Cl.
CPC ......... *B62D 53/0842* (2013.01); *B60D 1/015* (2013.01); *B60D 1/64* (2013.01); *B62D 53/125* (2013.01)

(58) Field of Classification Search
CPC ........ B60D 1/64; B60D 1/015; B62D 53/125; B62D 53/0842
See application file for complete search history.

(56) References Cited

U.S. PATENT DOCUMENTS

| 2,062,806 A | 12/1936 | Casler |
| 2,924,464 A * | 2/1960 | Cernoch ............. B62D 53/125 280/421 |

(Continued)

FOREIGN PATENT DOCUMENTS

| CN | 101108580 B | 2/2009 |
| CN | 102123905 A | 7/2011 |

(Continued)

OTHER PUBLICATIONS

European Patent Office; International Search Report; dated May 29, 2019.

*Primary Examiner* — Jacob D Knutson
*Assistant Examiner* — Ryan Edward Hardy
(74) *Attorney, Agent, or Firm* — Price Heneveld LLP

(57) ABSTRACT

A coupling system for a fifth wheel coupling includes a first plug unit having a plurality of first plug connectors, and a second plug unit having a plurality of second plug connectors to engage and transmit power and/or fluid with the first plug connectors, and an adjuster unit having a guide section configured to be brought into engagement with a retaining element on one of the plug units to transmit a force from the adjuster unit to the plug unit, which displaces the plug unit along a plug-in axis, wherein the adjuster unit can be displaced transversely and laterally to the plug-in axis or can be rotated about the plug-in axis.

19 Claims, 5 Drawing Sheets

(51) Int. Cl.
  *B60D 1/64* (2006.01)
  *B62D 53/12* (2006.01)

(56) References Cited

U.S. PATENT DOCUMENTS

| | | | | |
|---|---|---|---|---|
| 3,181,888 | A * | 5/1965 | Boylan | B62D 53/125 |
| | | | | 280/421 |
| 3,711,122 | A * | 1/1973 | Holmberg | B62D 53/125 |
| | | | | 280/421 |
| 3,734,537 | A * | 5/1973 | Holmberg | B62D 53/125 |
| | | | | 280/421 |
| 3,751,060 | A * | 8/1973 | Holmberg | B62D 53/125 |
| | | | | 280/402 |
| 4,260,173 | A * | 4/1981 | Kornahrens | B62D 53/125 |
| | | | | 280/421 |
| 6,672,608 | B2 * | 1/2004 | Metternich | B62D 53/125 |
| | | | | 280/421 |
| 6,709,001 | B1 * | 3/2004 | Morgan | B60D 1/62 |
| | | | | 280/421 |
| 2006/0255559 | A1 * | 11/2006 | Abate | B62D 53/125 |
| | | | | 280/433 |

FOREIGN PATENT DOCUMENTS

| | | | |
|---|---|---|---|
| CN | 205801283 U | 12/2016 | |
| CN | 105228889 A | 7/2017 | |
| DE | 1041806 | 10/1958 | |
| DE | 601 02 393 | 2/2005 | |
| DE | 202016102707 | 8/2016 | |
| DE | 202017101339 | 6/2017 | |
| EP | 2072384 | 6/2009 | |
| EP | 2072384 A1 | 8/2010 | |
| EP | 2899202 A1 | 7/2015 | |
| WO | WO-03078238 A2 * | 9/2003 | B62D 53/125 |
| WO | WO-2009080516 A1 * | 7/2009 | B62D 53/0842 |
| WO | WO-2009080519 A1 * | 7/2009 | B62D 53/0842 |
| WO | WO-2009080520 A1 * | 7/2009 | B60D 1/64 |
| WO | WO-2017198242 A1 * | 11/2017 | B62D 53/125 |

* cited by examiner

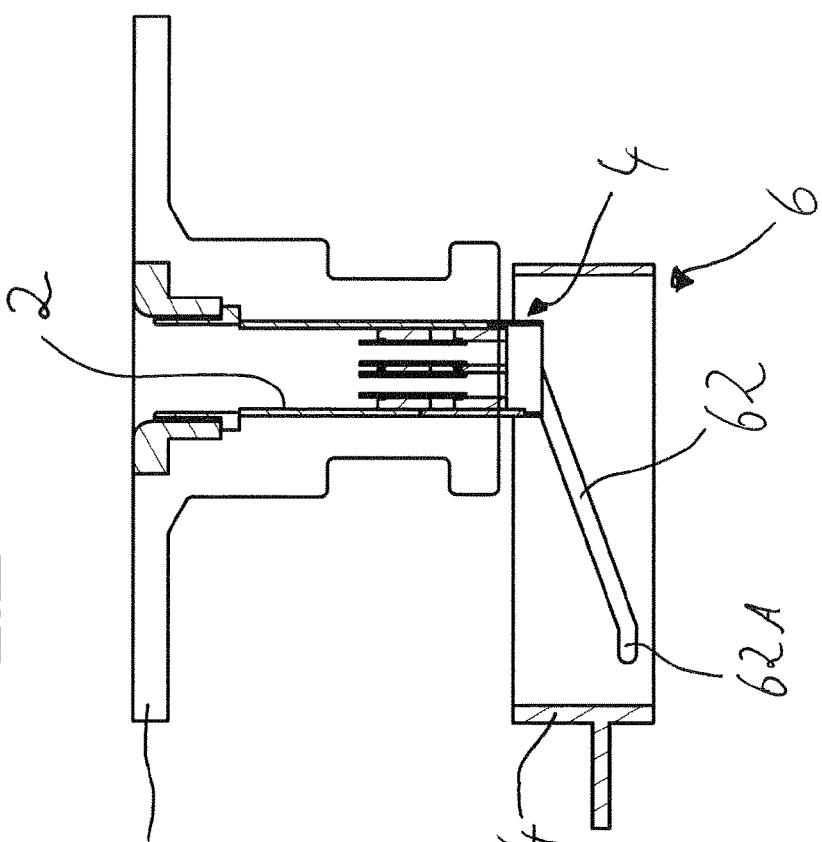
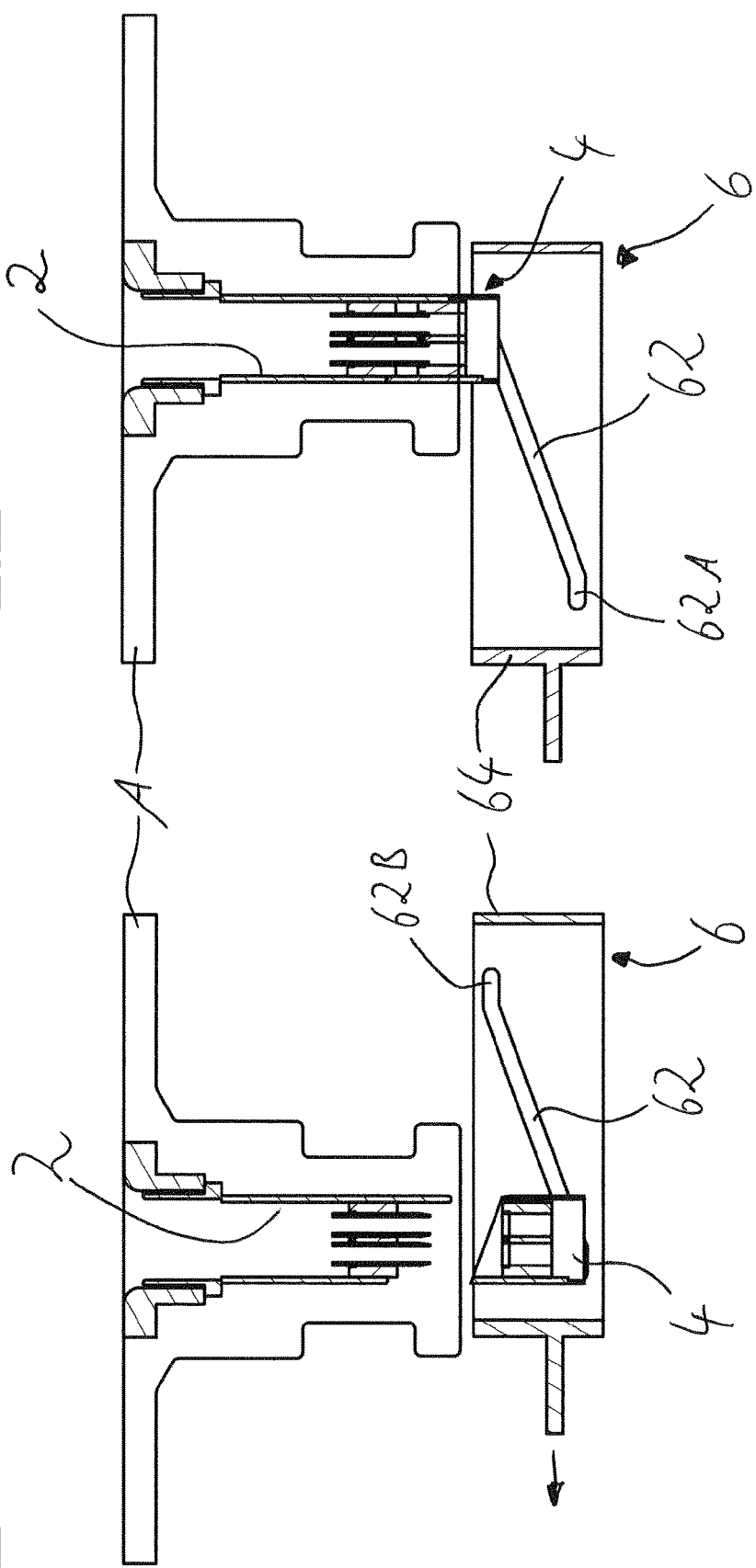

COUPLING SYSTEM

BACKGROUND OF THE INVENTION

The present invention concerns a coupling system for a fifth wheel coupling.

Coupling systems for fifth wheel couplings as such are known from the state of the art. It is also known and common practice to establish various line connections between the towing vehicle and the trailer for the compressed air and energy supply of the trailer of a utility vehicle. Usually elastic and preferably spiral-shaped lines are used for this purpose directly between fixed sockets on the towing vehicle and the trailer. Recently, attempts have also been made to find ways of transferring energy from the towing vehicle to the trailer directly in the area of the mechanical coupling, i.e. in the area of the coupling plate and the kingpin. So far, however, it has not been possible to provide a coupling system for a fifth wheel coupling in which a large number of different lines on the towing vehicle and on the trailer can be connected to each other and at the same time create the possibility of an automated coupling process.

The object of the present invention is to provide a coupling system for a fifth wheel coupling which, on the one hand, allows a large number of different energy supply channels and, on the other hand, permits fully automated coupling processes between the towing vehicle and the trailer.

SUMMARY OF THE INVENTION

According to the invention, the coupling system comprises a first plug unit and a second plug unit, wherein the first plug unit can be fixed in the kingpin of a fifth wheel coupling and wherein the second plug unit can be fixed in the region of the coupling plate of the fifth wheel coupling, wherein the first plug unit has a plurality of first plug connectors and wherein the second plug unit has a plurality of second plug connectors which are adapted to engage and transmit power and/or fluid with the first plug connectors, wherein at least one adjuster unit is provided which has at least one guide section which can be brought into engagement with a retaining element on one of the plug units in order to transmit a force acting along or parallel to the plug-in axis from the adjuster unit to the plug unit, which displaces the respective plug unit along or parallel to the plug-in axis towards or away from the respective opposite plug unit, wherein the adjuster unit can be displaced transversely and laterally to the plug-in axis or can be rotated about the plug-in axis in order to apply the force. The coupling system thus comprises a plug unit which is arranged on the trailer and thus in the kingpin of the trailer and a second plug unit which is fixed in the area of the fifth wheel coupling and there in particular on the coupling plate. The plug units are each connected to a number of lines, wherein the lines lead into the first and second plug connectors. When the first and second plug units are coupled together, the first plug connectors are connected to the correspondingly arranged and designed second plug connectors, so that energy and fluids can be transmitted between the lines coming from the towing vehicle via the plug connectors to the lines located on the trailer. At least one of the plug units can be displaced along a plug-in axis and is otherwise essentially secured against displacement transverse to the plug-in axis. In an initial state in which the plug units are spaced apart, the coupling process between the kingpin and the coupling plate can take place or the connection between the kingpin and the fifth wheel can be disconnected. When the kingpin is fixed in the fifth wheel, the adjuster unit is used, which is designed to move one of the two plug units along the plug-in axis so that it engages with the opposite plug unit. The adjuster unit can be located either in the area of the fifth wheel coupling or in the area of the king pin or above the king pin. For this purpose, the adjuster unit has a guide section which is in positive engagement with a correspondingly designed retaining element on one of the two plug units, whereby a transverse displacement of the adjuster unit or a rotation of the adjuster unit relative to the respective plug unit transmits a force which acts along or parallel to the plug-in axis to the plug unit and displaces it in the direction of the opposite plug unit or away from it. In this way, the adjuster unit can be used to connect or disconnect the plug units, whereby only a simple transverse or rotational movement of the adjuster unit is required, and the positive connection between the retaining element and the guide section converts this movement into a movement of one of the plug units along the plug-in axis. The adjuster is advantageously driven by a motor or engagement geometry, on the towing vehicle or on the trailer, which allows automatic operation of the adjuster unit. This allows automatic operation of the coupling process, i.e. connection of the plug units without external intervention by the driver. Since the plug units do not move relative to each other when plugged together, i.e. they are firmly plugged together, a large number of plug connectors arranged side by side can be provided in a plug unit, which interlock with each other positively. This is a difference to the likewise known embodiments in which sliding contacts between a first plug unit and a second plug unit are each firmly connected to the towing vehicle or trailer. In the present invention, at least one of the plug units is designed to be rotatable either to the fifth wheel coupling or to the kingpin, so that a firm connection of the plug units with each other can be established. In this way, the number of electrical signal and power transmission lines and fluid transmission lines can be maximized without having to increase the diameter of the plug units to such an extent that they no longer fit into a kingpin. In this way, the present invention makes it possible to use the coupling system also in fifth wheel couplings in which only the 2" kingpins are used, which are too small for the solutions known from the state of the art so far or which allow only an insufficient number of individual contacts. In addition, the solutions known from the state of the art are firmly connected to a pivoted kingpin, whereby the kingpin has to be laboriously turned into the correct position by external components before connecting the lines. The outer contour of the kingpins known from the state of the art does not correspond to the mandatory and standardized outer contour and is only compatible with conventional vehicles to a limited extent. This problem is solved by the present invention, as the small diameter of the first plug unit allows the kingpin to be designed with standardized external dimensions and still guaran-tee the required strength.

Preferably in a state in which the coupling plate is connected to the kingpin, the first plug unit and the second plug unit are secured against displacement laterally to the plug-in axis. The reference system for the position of the plug-in axis is thus the kingpin and/or the coupling plate of the fifth wheel coupling. In other words, the plug-in axis is preferably only defined when the kingpin is fixed to the fifth wheel coupling, in which case the first plug unit and the second plug unit are opposite each other in such a way that the plug connectors of both plug units extend essentially parallel to the plug-in axis, and thus a pure transverse movement of one of the plug units along the plug-in axis enables the respective plug connectors to be coupled together.

In a first preferred embodiment, the adjuster unit is designed and fixed to either the coupling plate or the king pin in such a way that a displacement movement is only possible along the adjusting axis. In this embodiment, a transverse movement of the adjuster unit along the adjusting axis causes the retaining element and the plug unit equipped with the retaining element to be displaced along the plug-in axis via the guide section. The advantage of this embodiment is that the simple and robust construction can be used especially for rough appli-cations in the exposed area of a fifth wheel coupling, since the components of the adjuster unit designed for simple mechanical movements are insensitive to dirt and foreign bodies.

It is advantageous for the adjusting axis to be perpendicular to the plug-in axis. This is particularly advantageous when the actuator is fixed to the coupling plate of a fifth wheel coupling, since both the adjuster unit itself and its drive mechanism can be arranged underneath the coupling plate in a space-saving manner, requiring little installation space.

Furthermore, preferably in this embodiment, the guide section of the adjuster unit has a distal first end and a distal second end offset from the first end parallel to the adjusting axis, the first end and the second end having an offset to one another measured perpendicular to the adjusting axis. The offset of the first and the second end of the guide section is preferably the distance parallel to the plug-in axis by which the holding element is displaced when the adjuster unit is moved along the adjusting axis relative to the respective plug unit. Particularly preferred is the formation of a bevel on the guide section between the distal ends of the guide section, along which the retaining element can slide in a form-fit manner and is thereby displaced parallel to the insertion axis. It is preferred that the plug units are spaced apart when the retaining element is engaged with the first distal end. In the state in which the retaining element is in the area of the second distal end and is engaged with it, the plug units are connected to each other.

In an alternatively preferred embodiment, the adjuster unit is designed to rotate about the plug-in axis, with the guide section wound spirally, or helically, about the plug-in axis. In this case, the adjuster unit is preferably set in rotation around the plug-in axis relative to the plug unit by an electric motor. A displacement movement of the adjuster unit along an adjusting axis is not necessary in this embodiment. The advantage of this embodiment is that the adjuster unit and its drive mechanism require the least possible installation space, while the driving force required to rotate the adjuster unit is low. As an alternative to the spiral-shaped design of the guide section, the actuator can also be displaceable along the adjusting axis, wherein the adjusting axis is parallel or collinear to the plug-in axis, however. In this case, the adjuster unit together with the positively engaged plug unit is displaced along the adjusting axis by means of a lifting cylinder or an electrically operated spindle until the plug unit engages or disengages with the respective opposite plug unit. The advantage of this embodiment is that with this type of actuation the lowest friction losses occur due to the geometries of the retaining element and the guide section rubbing against each other.

It is advantageous for the first end and the second end to be spaced apart by a guide length measured parallel to the adjusting axis, where the offset is 0.1 to 0.3 times the guide length, or 0.3 to 0.8 times the guide length, or 0.7 to 1.2 times the guide length. With a ratio range of the offset to the guide length of 0.1 to 0.3, the average increase in the inclined plane of the guide section is thus relatively small and only small forces are required to displace the adjuster unit along the adjusting axis. The alternatively preferred range of 0.3 to 0.8 of the ratio of the offset to the guide length allows a greater distance to be covered by the plug unit which is in engagement with the adjuster unit, while at the same time saving the space required for the displacement movements of the actuator. In the case of very limited space in the area where the adjuster unit is fixed, a ratio of the offset to the guide length of 0.7 to 1.2 may also be preferred, since in this case a comparatively large distance covered by the plug unit along the plug-in axis can be achieved with only a very small displacement path of the adjuster unit along the adjusting axis. In this context, a range of 0.2 to 0.9 is particularly preferred for the ratio of the displacement to the guide length, this range achieving a good com-promise between the shortest possible path length at the adjuster unit, the lowest possible frictional wear or abrasive wear at the guide section of the adjuster unit and at the same time the longest possible displacement path covered by the plug unit along the plug-in axis.

Preferably, the first and/or the second distal end of the guide section have a detent section. The detent section is an area of the guide section which either extends parallel to the adjusting axis, or alternatively preferably forms a local depression, i.e. a local recess in relation to the surrounding areas of the guide section, so that the retaining element can only be moved out of this detent section again by applying a defined force. This defined force is preferably greater than the forces that occur during normal vibrations on a utility vehicle. By using one or more detent sections on the guide section, it is possible to dispense with additional securing of the position of the adjuster unit relative to the plug unit and in particular the positioning of the retaining section in the guide section. It is advantageous that the detent section has a locally smaller offset, which is measured perpendicular to the adjusting axis, than the surrounding areas of the guide section. Furthermore, a corresponding reset element can preferably be provided on the first or second plug unit, which presses the plug element and the retaining element fixed to it into the detent section, so that a temporary displacement prevention between the plug element and the adjuster unit is guaranteed.

Particularly preferred, the first plug unit has a first driver geometry and the second plug unit has a second driver geometry, the first and second driver geometries being designed in such a way that when the plug units are brought together they engage with one another and cause the first and second plug connectors to rotate and/or align relative to one another about the plug axis, so that each first plug connecter is arranged opposite a corresponding second plug connecter parallel to the plug-in axis. The driver geometry thus ensures that the two plug units are correctly aligned with each other before the plug connectors are coupled together. In this way, the driver geometries on the first and second plug units compensate in particular for an angled position of the towing vehicle and trailer, so that the towing vehicle and trailer do not have to be coupled along a straight line, but an angled position is possible. After the towing vehicle and the trailer have been coupled together, in this case the adjuster unit is put into operation and shifts one of the plug units towards the other plug unit in such a way that the driver geometries come into contact with each other. At least one of the driver geometries has an inclined surface which makes it necessary for the opposite driver geometry to slide along until both driver geometries have been brought into a certain angular position, rotating about the plug-in axis, while at the same time the distance between the plug units has been reduced. In this position, each of the first plug connectors is preferably opposite the corresponding second plug connector provided for a coupling, so that the plug connectors can be properly coupled with each other when the plug units are further displaced towards each other. It is understood that for this purpose at least one of the plug units is mounted on the towing vehicle or on the trailer so as to be rotatable about the plug-in axle.

It is advantageous if the first and/or second driver geometry is formed as a plane surface which is inclined to a plane perpendicular to the plug-in axis. In order to provide an inclined plane along which the respective opposite driver geometry can slide during a displacement movement of the plug units along towards each other, and in the process a twisting movement takes place between the plug units relative to each other, the driver geometry or preferably both driver geometries are designed as a flat surface which is transverse to a plane perpendicular to the plug-in axis. The degree of inclination is preferably in the range between 20° and 60°, whereby in this range reliable alignment of the two plug units to each other can be achieved by the driver geometry.

It is advantageous if a securing projection is formed on or adjacent to the first or second driver geometry, which can be brought into engagement with a corresponding securing recess on or adjacent to the opposite driver geometry. The securing projection and the securing recess extend essentially with a constant cross-section parallel to the plug-in axis, whereby after the two plug units have reached the correct rotational position relative to one another, the securing projection can be inserted into the securing recess along the plug-in axis. The combi-nation of the securing projection and the securing recess thus not only ensures that, after the plug units have reached the correct rotational position relative to each other, a further displacement movement of the plug units towards each other parallel to the plug-in axis is possible, but at the same time also secures the rotational position of the two plug units in such a way that a reliable coupling of the plug connectors can take place.

It is advantageous that the first plug unit is designed to be rotatable about the plug-in axis relative to the kingpin, wherein the adjuster unit and the second plug unit are arranged on the coupling plate, whereby the adjuster unit is guided on the coupling plate so as to be displaceable along the adjusting axis. The first plug unit is thereby rotatably mounted in the kingpin, but is in particular secured against displacement transversely and parallel to the plug-in axis. This enables the first and the second plug unit to be firmly connected to each other, especially during steering movements and swivelling of the towing vehicle relative to the trailer, whereby the first plug unit rotates within the kingpin. It goes without saying that the lines arranged on the first plug unit are therefore designed to be flexible and preferably project from the area of the first plug unit with corresponding loops in order to provide in particular sufficient deformation path which is caused by the swivelling movements of the towing vehicle relative to the trailer.

Furthermore, the adjuster unit preferably comprises an adjuster housing, wherein the guide section is integrally formed on the adjuster housing. The adjuster housing of the adjuster unit is preferably an essentially cuboid hollow body, the guide section preferably being designed as a recess on this adjuster housing. The adjuster housing of the adjuster unit ensures high strength and at the same time a reduction in the number of components required, resulting in a particularly robust construction which is particularly suitable for use underneath the coupling plate of a fifth wheel coupling. Preferably, the adjuster housing may further have lub-ricant storage areas that allow constant lubrication of the guide section to keep both frictional resistance and wear on the guide section low.

In particular, the first and second plug connectors preferably comprise first and second electrical connectors and first and second fluid transfer connectors. It is advantageous that the number of electrical connectors is higher than the number of fluid transfer connectors. In a particularly preferred embodiment, at least two fluid transfer connectors are formed on the first and the second plug unit respectively, wherein preferably a plurality, and more preferably more than five, of electrical connectors are formed on the first and the second plug unit respectively. In a particularly preferred embodiment, at least seven electrical plug connectors are formed on each plug unit, so that a plurality of signal lines are available in addition to electrical supply lines. This makes it possible to reduce the number of control systems required on the trailer for a plurality of controllable functions and to integrate these into the systems available on the towing vehicle. Particularly preferably, the first and second plug connectors are arranged compactly next to each other in order to make the best possible use of the space available in the kingpin. The sum of the respective outer cross-sections of all plug connectors added together is preferably 0.5 to 0.8 times the total cross-sectional area of the respective plug unit in a sectional plane perpendicular to the plug-in axis at the level of the respective plug connectors.

The adjuster unit has an actuating section at which a force acting parallel to the adjusting axis can be introduced into the adjuster unit. The actuating section is preferably an engagement geometry on which a corresponding element or a motor can act in such a way that a displacement of the adjuster unit parallel to the adjusting axis is effected. The actuating section is particularly designed for positive engagement, i.e. preferably as a thread or as an undercut area.

It is advantageous that the actuating section is designed as a threaded spindle. A gear driven by an electric motor can be directly connected to an actuating section designed as a threaded spindle. As an alternative to the threaded spindle design, the actuating section can also be connected to a piston of a pneumatic cylinder or be integrally connected to it in order to cause a movement of the piston into a movement of the adjuster unit parallel to the adjusting axis.

Preferably, the first plug unit has an essentially cylindrical outer geometry, wherein a retaining flange is formed on the cylindrical outer geometry of the first plug unit. The cylindrical outer geometry of the first plug unit allows its use inside a kingpin. The retaining flange serves to prevent displacement parallel and preferably also transverse to the plug-in axis relative to the kingpin while simultaneously allowing rotation about the plug-in axis relative to the kingpin. As an alternative or in addition to the retaining flange on the first plug unit, the second plug unit can also be rotatably mounted and held on the coupling plate via a retaining flange. The retaining flange is particularly preferably a bearing surface of an axial bearing, e.g. a front roller bearing, and thus supports a particularly smooth rotation of the respective plug unit.

Furthermore, it is preferable that the first plug unit is arranged with a clearance fit in a corresponding engagement geometry on the kingpin. The clearance fit allows rotation and is advantageously selected so tightly that oscillation of the plug unit with large amplitudes relative to the kingpin is prevented. To support the guidance of the plug unit, sliding and/or guide bushes are preferably provided in the area of the recess on the kingpin. These bushes can be equipped with self-lubricating material, which reduces wear on the plug unit and improves the ease of rotation in the kingpin.

BRIEF DESCRIPTION OF THE DRAWINGS

Further advantages and features of the present invention result from the following description with reference to the attached figures. It is understood that individual features which have only been shown in one of the embodiments may also be used in embodiments of other figures, unless this has been explicitly excluded or is prohibited by technical circumstances. It is shown in:

FIG. 3 is a cross-sectional side elevation view of a preferred coupling system in a first state;

FIG. 4 is a cross-sectional side elevation view of a preferred coupling system in a second state;

FIG. 8 is a perspective view of the underside of a coupling plate with.

DETAILED DESCRIPTION OF THE PREFERRED EMBODIMENTS

Figure 1:
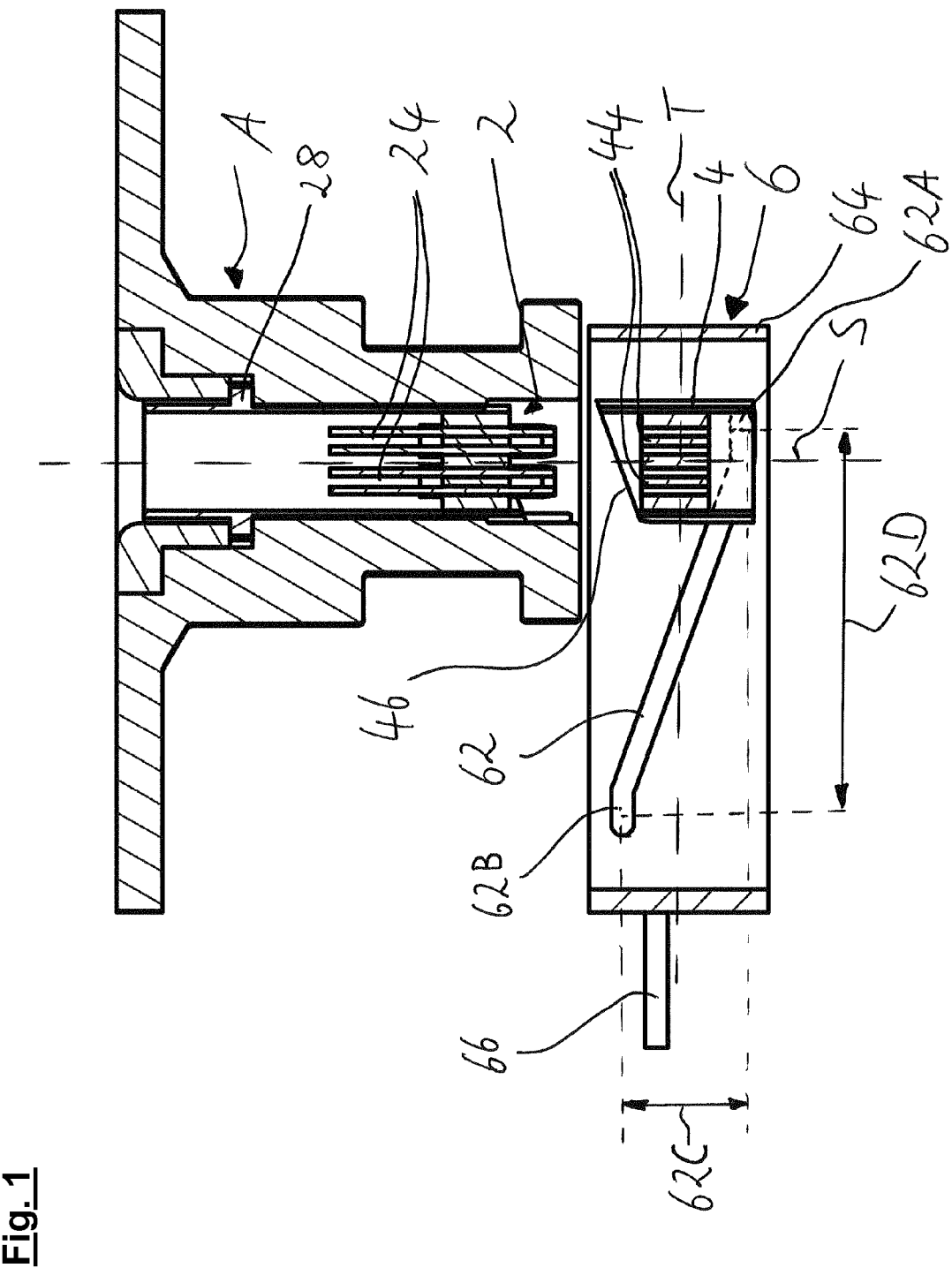
FIG. 1 is a cross-sectional side elevation view of a first preferred embodiment of the coupling system according to the invention.

The preferred embodiment of the coupling system shown in FIG. 1 shows a kingpin A in a position where it is fixed to a coupling plate B of the fifth wheel coupling not shown. In this position a first plug unit 2 and a second plug unit 4 are opposite each other and are offset to each other along a plug-in axis S. The second plug unit 4 is preferably mounted on the coupling plate B (not shown) of a fifth wheel coupling in such a way that movement is only possible along the plug-in axis S. Also mounted on the coupling plate B is an adjuster unit 6, which can be displaced transversely to the plug-in axis S and, in particular, preferably parallel to an adjusting axis T relative to the coupling plate B and the second plug unit 4. The adjuster unit 6 has a housing 64 with a guide section 62, which has an offset 62C of a first distal end 62A and a second distal end 62B. When the adjuster unit 6 shown in the figure is displaced to the right, at least one retaining element 42 provided on the second plug unit 4 (covered in this figure) is guided within the guide section 62 in such a way that a transverse movement of the second plug unit 4 takes place parallel to the plug-in axis S and the second plug unit 4 is displaced upwards in the direction of the first plug unit 2. During this process, the second plug unit 4 is moved along the plug-in axis S by the offset 62C provided on the guide section 62. The offset 62C is dimensioned in such a way that the second plug unit is located within the volume defined by the housing 64 of the adjuster unit 6 in the completely lowered state as shown in FIG. 1. In this way the second plug unit can be protected against mechanical damage inside the adjuster unit. Not shown in this embodiment are the guide means which are fixed to the coupling plate B of the fifth wheel coupling or are integral with it and which secure the second plug unit 4 against displacement transversely to the plug-in axis S. These guide means can, for example, take the form of jaws which project through the adjuster unit. Alternatively, these guide means can also be recesses into which the second plug unit 4 engages, preferably by means of an extended retaining element 42. Furthermore, the guide length 62D of the guide section 62 is also shown, which is the extension of the guide section 62 parallel to the adjusting axis T. In this preferred embodiment, the offset 62C has a ratio of 0.2 to 0.4 to the guide length 62D. This relatively small increase of the guide section from the first end 62A to the second end 62B means that even with a small force transmitted to the housing 64 of the adjuster unit 6, the second plug unit 4 can be reliably coupled to the first plug unit 2 without major friction losses or surface wear due to sliding friction. To introduce the force into the housing 64 of the adjuster unit 6, an actuating section 66 is provided, which is only shown very schematically in FIG. 1. The actuating section 66 is preferably a threaded spindle on which a corresponding toothing engages in order to displace the adjuster unit 6 along the adjusting axis T. The first plug unit 2 has a substantially cylindrical outer geometry, wherein a retaining flange 28 is formed on the cylindrical outer housing of the first plug unit 2. The retaining flange 28 is designed to abut a corresponding shoulder within the recess in the kingpin A and to be secured by a corresponding retaining element from above in FIG. 1. It is advantageous that the first plug unit 2 and also the retaining flange 28 are implanted in the respective engagement geometries with clearance fit, so that in particular a rotation of the first plug unit 2 about the plug-in axis S remains possible. This rotation of the first plug unit 2 is preferred so that even with a twisted initial arrangement of the first plug unit 2 and the second plug unit 4 in relation to each other, the first plug unit 2 can rotate or be rotated about the plug-in axis S during the coupling process in such a way that shortly before coupling, the corresponding plug connectors 24, 44 are arranged opposite each other and can be coupled together. For this purpose, the first plug unit 2 and the second plug unit 4 each have driver geometries 26, 46, which ensure the correct alignment of the plug units 2, 4 to each other.

Figure 2:
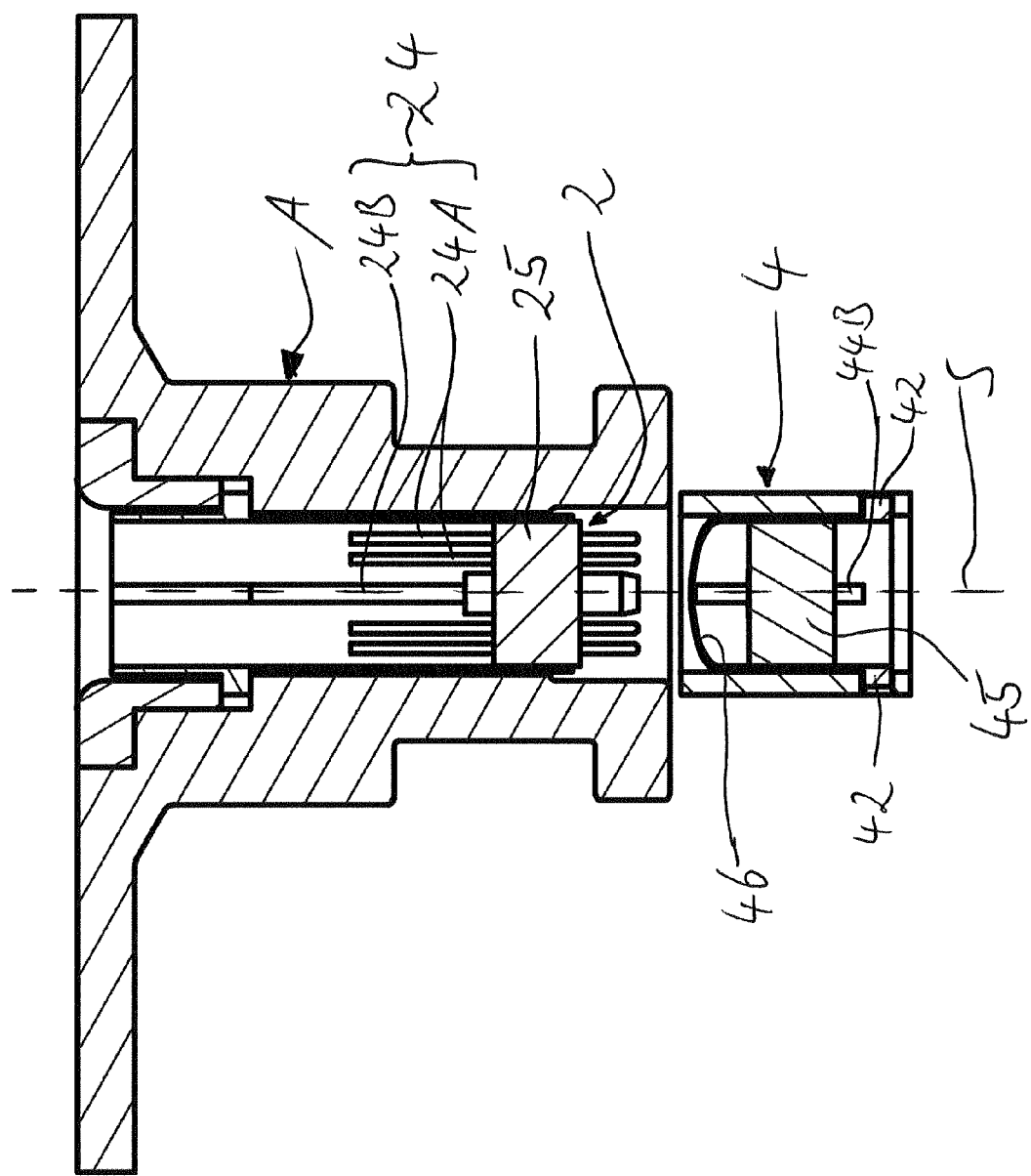
FIG. 2 is a second cross-sectional side elevation view of the coupling system shown in FIG. 1.

FIG. 2 shows a sectional view of the embodiment of the coupling system shown in FIG. 1, with the sectional plane in FIG. 2 perpendicular to the sectional plane of FIG. 1. The second driver geometry 46, which is also shown in FIG. 1, can be recognised here and is preferably designed as an inclined or sloping surface in relation to a plane perpendicular to the plug-in axis S. Furthermore, it can be seen that first electrical connectors 24A are provided adjacent to the first fluid transfer connectors 24B, which are shown in FIG. 1. Preferably, at least four electrical connectors 24A, 44A are provided on the first and second plug units 2, 4, respectively. It is advantageous that the first electrical connectors 24A and the first fluid transfer connectors 24B are held in a plug block 25 of the first plug unit 2. It is advantageous for the first plug connectors 24 to pass through the cutouts in the plug block 25 and to be glued there. For the second plug unit 4 a corresponding fixation of the second plug connections 44 is also provided, whereby only the second plug block 45 and one of the second fluid transfer connectors 44B are shown in FIG. 2.

FIG. 3 and FIG. 4 show two operating states of a preferred embodiment of the coupling system according to the invention. FIG. 3 shows the state in which the adjuster unit 6 has just begun to move to the left, whereby it can be seen that, in particular in contrast to the state shown in FIG. 1, the second plug unit 4 at its upper end already projects slightly from the volume spanned by the housing 64 of the adjuster unit 6. By displacing the adjuster unit 6 further to the left and the guide section 62 guiding the retaining element 42 formed on the second plug unit 4 in a form-fitting manner, the second plug unit 4 is displaced upwards in the direction of the first plug unit 2. FIG. 4 finally shows the state in which the adjuster unit 6 has been displaced completely to the left and the retaining element 42 (preferably two retaining ele-ments 42 of which only one is shown) has arrived at the second distal end 62B of the guide section 62, the first plug connectors 24 and the second plug connectors 44 being coupled to one another in this state.

Figure 5:
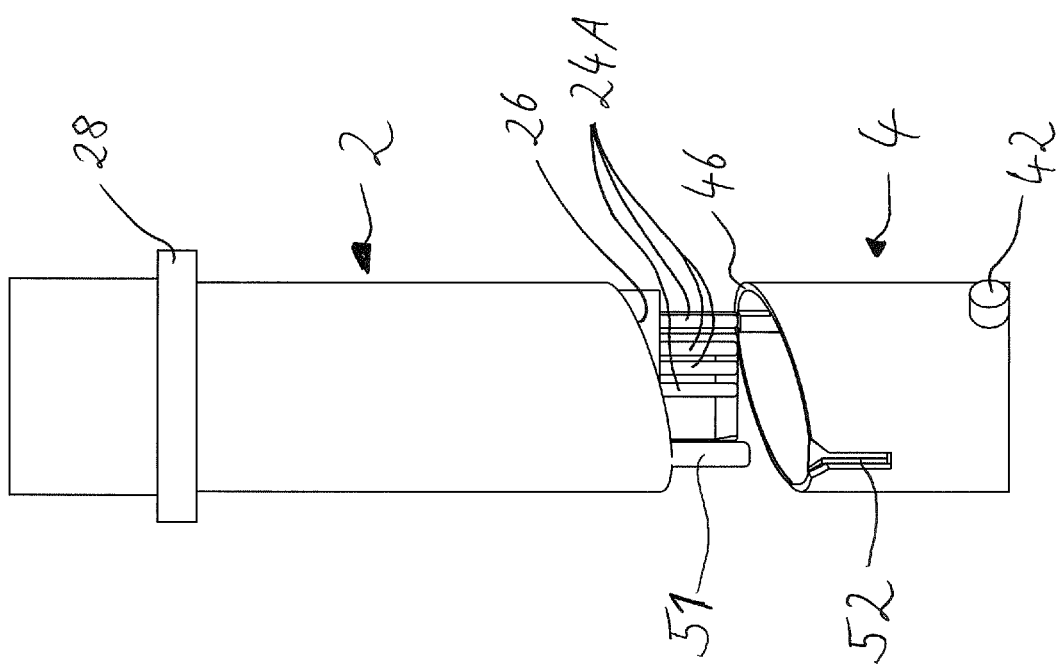
FIG. 5 is a cut-away, side elevation view of a first and a second plug unit.

FIG. 5 shows a detailed view of the first plug unit 2 and the second plug unit 4, showing that the first plug unit 2 has a substantially cylindrical housing on which a retaining flange 28 is formed. The housing together with the retaining flange 28 is used to insert the first plug unit 2 into a recess on king pin A with a clearance fit, wherein the first plug unit 2 is secured against displacement along the plug-in axis S by the retaining flange 28 and is otherwise rotatably arranged in the king pin A. The easily rotatable mounting of the first plug unit 2 is particularly important in order to be able to perform a twisting movement during coupling of the first plug unit 2 and the second plug unit 4, so that the plug connectors 24, 44 can be arranged opposite one another on both plug units 2, 4. On the other hand, it is important in the coupled state that the first plug unit 2 can rotate relative to kingpin A in order to be able to compensate for a steering movement of the towing vehicle relative to the trailer. The second plug unit 4 in the present preferred embodiment is preferably secured against rotation relative to the coupling plate B of the fifth wheel coupling. Thus, all compensation of steering movements or swivel movements between the towing vehicle and the trailer must be compensated by the rotatable bearing of the first plug unit 2 within the kingpin A. The first plug unit 2 preferably has a securing projection 51, which projects downwards from the first driver geometry 26 essentially parallel to the plug-in axis S. When the first plug unit 2 and the second plug unit 4 are coupled together, the securing projection initially slides along the second driver geometry 46 on the second plug unit 4 until the correct position of the first plug unit 2 to the second plug unit 4 is reached. Finally, shortly before the first and second plug connectors 24, 44 are coupled together, the securing projection 51 engages with a securing recess 52, which is provided on the second plug unit 4. In this state, the positive engagement between the securing projection 51 and the securing recess 52 supports the retention of the twisted position of the first plug connectors 24 with respect to the second plug connectors 44 in such a way that they can be coupled together without any risk of tilting.

Figure 6:
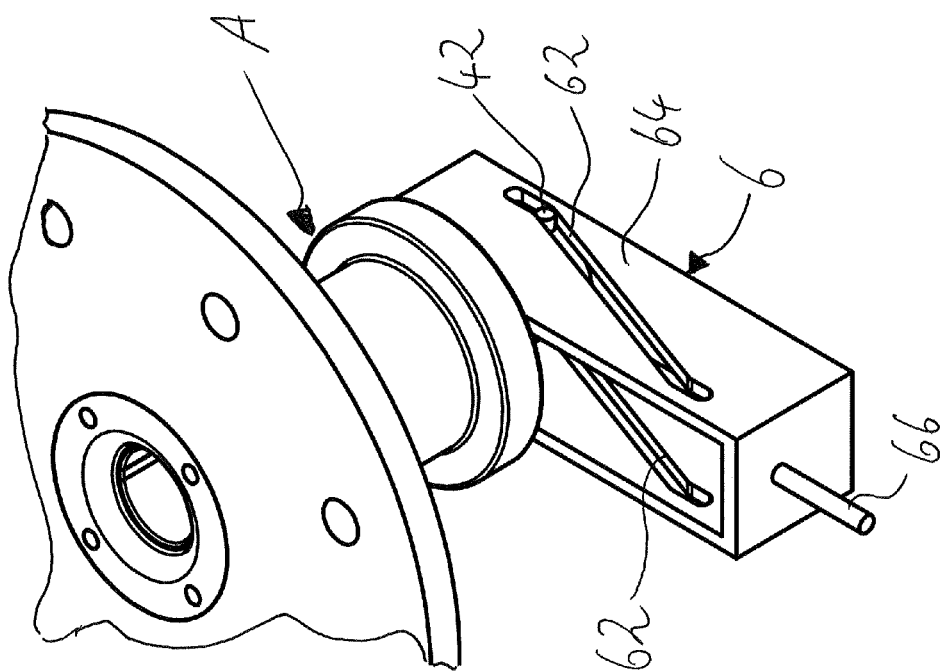
FIG. 6 is a partial perspective view of a preferred embodiment of a coupling system according to the invention.

FIG. 6 shows a perspective view of a preferred embodiment of the coupling system according to the invention. In particular, the shape of the housing 64 of the adjuster unit 6 is illustrated, which has an essentially rectangular outline, spans a cuboid volume and has a guide section 62 on each of its two long sides.

Figure 7:
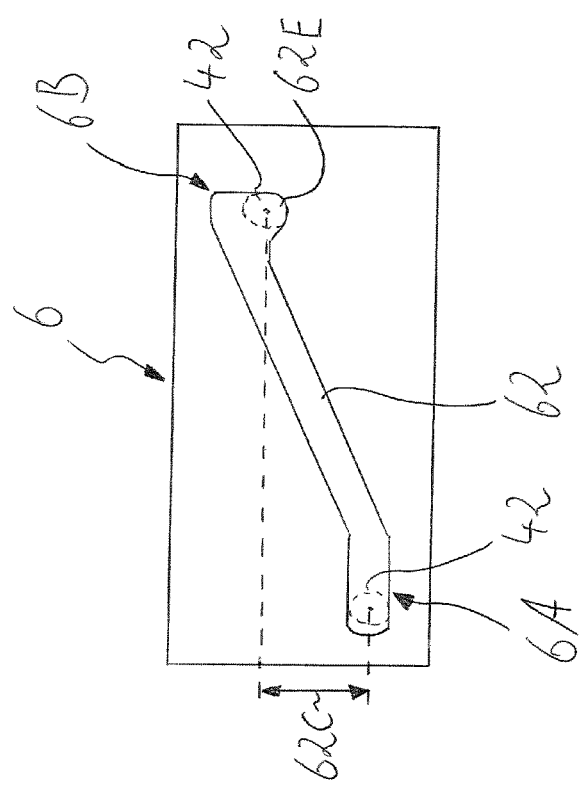
FIG. 7 is a schematic side of a preferred embodiment of an adjuster unit.

FIG. 7 shows a side view of a preferred embodiment of the adjusting unit 6 with a re-cessed guide section 62, which has a first end 62A and a second end 62B as in the embodiment shown above. In contrast to the embodiments shown above, a detent section 62E is formed at the second end 62B, which is shaped as a recess in the area of the second end 62B. In the detent section 62E, the retaining element 42 shown as a dashed line engages and can be held securely in this position, especially when the utility vehicle is in operation and vibrations and shocks occur, without a holding force having to be permanently applied to the adjuster unit 6, which pulls it to the left in the figure. If a detent section 62E is present, the offset 62C is measured between the positions of the retaining element 42 at the first end 62A and in the detent section 62E, as also shown in the figure.

Figure 8:
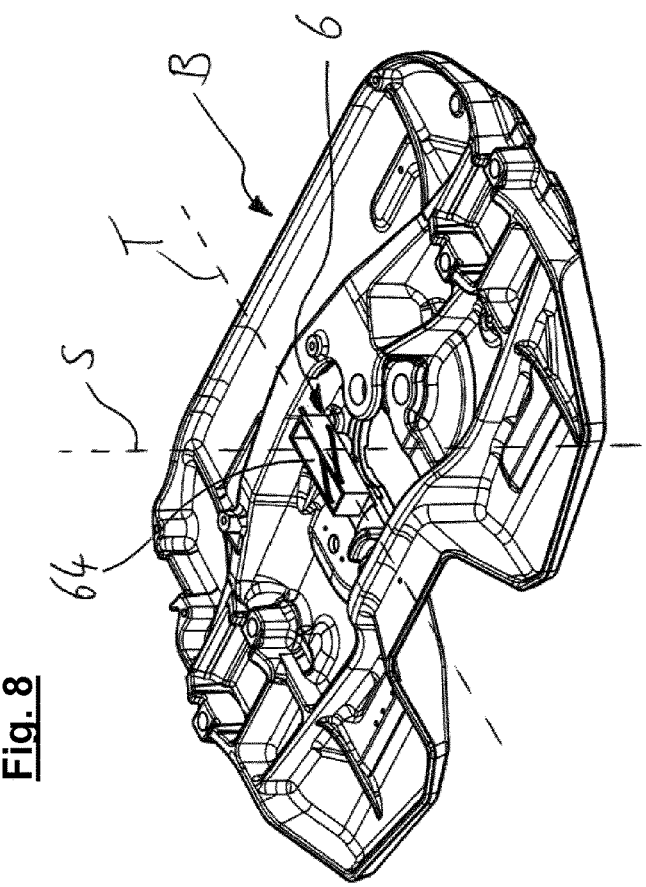

FIG. 8 shows a perspective view of the underside of a coupling plate B of a fifth wheel coupling with the adjuster unit 6 arranged thereon. As described for the previous embodiments, the adjuster unit 6 has a housing 64, which is mounted on the coupling plate B along the adjusting axis T.

REFERENCE SIGNS

2—first plug unit
24—first plug connectors
24A—first electrical connector
24B—first fluid transfer connector
25—first plug block
26—first driver geometry
28—retaining flange
4—second plug unit
42—retaining element
44—second plug connectors
44A—second electrical connector
44B—second fluid transfer connector
45—second plug block
46—second driver geometry
51—securing projection
52—securing recess
6—adjuster unit
62—guide section
62A—first end
62B—second end
62C—offset
62D—guide length
62E—detent section
64—housing
66—actuating section
A—kingpin
B—coupling plate
S—plug-in axis
T—adjusting axis

The invention claimed is:
1. A coupling system for a fifth wheel coupling, comprising:
a first plug unit; and
a second plug unit;
wherein the first plug unit is configured to be fixed in a kingpin of a fifth wheel coupling;
wherein the second plug unit is arranged in the region of a coupling plate of the fifth wheel coupling;
wherein the first plug unit has a plurality of first plug connectors;
wherein the second plug unit has a plurality of second plug connectors configured to engage and transmit power and/or fluid with the first plug connectors;
wherein at least one adjuster unit includes at least one guide section configured to be brought into engagement with a retaining element on the second plug unit to transmit a force acting along or parallel to a plug-in axis from the at least one adjuster unit to the plug unit, which displaces the second plug unit along or parallel to the plug-in axis toward or away from the opposite first plug unit;

the at least one adjuster unit being displaceable transversely and laterally to the plug-in axis or rotatable about the plug-in axis in order to apply the force;

wherein the first plug unit has a cylindrical outer geometry; and wherein a retaining flange formed on the cylindrical outer geometry of the first plug unit is configured to prevent displacement parallel and transverse to the plug-in axis relative to the kingpin while simultaneously allowing rotation about the plug-in axis relative to the kingpin.

2. The coupling system according to claim 1, wherein the first plug unit and the second plug unit are secured against displacement laterally to the plug-in axis.

3. The coupling system according to claim 2, wherein the at least one adjuster unit can only be displaced along an adjusting axis and is otherwise secured against displacement relative to the kingpin or the coupling plate.

4. The coupling system according to claim 3, wherein the adjusting axis is perpendicular to the plug-in axis.

5. The coupling system according claim 3, wherein the guide section has a distal first end and a distal second end offset from the first end parallel to the adjusting axis, and wherein the first end and the second end have an offset relative to each other measured perpendicular to the adjusting axis.

6. The coupling system according to claim 5, wherein the first end and the second end are spaced apart from each other by a guide length measured parallel to the adjusting axis.

7. The coupling system according to claim 5, wherein the first end and/or the second end has/have a detent section.

8. The coupling system according to claim 1, wherein the first plug unit has a first driver geometry and the second plug unit has a second driver geometry, and wherein the first and second driver geometries are configured such that when the first and second plug units are brought together the first and second plug units engage with one another and cause the first and second plug connectors to rotate and/or align relative to one another about the plug-in axis, such that each first plug connector is arranged opposite a corresponding second plug connector parallel to the plug-in axis.

9. The coupling system according to claim 8, wherein the first driver geometry and/or the second driver geometry includes a plane surface which is inclined to a plane perpendicular to the plug-in axis.

10. The coupling system according to claim 8, wherein a securing projection is formed on or adjacent to the first or second driver geometry, which can be brought into engagement with a corresponding securing recess on or adjacent to the opposite driver geometry.

11. The coupling system according to claim 1, wherein the first plug unit is configured to rotate about the plug-in axis relative to the king pin, wherein the at least one adjuster unit and the second plug unit are arranged on the coupling plate, and wherein the at least one adjuster unit is guided on the coupling plate so as to be displaceable along an adjusting axis.

12. The coupling system according claim 1, wherein the at least one adjuster unit comprises a housing, and wherein the guide section is integrally formed on the housing.

13. The coupling system according to claim 1, wherein the first and second plug connectors comprise first and second electrical connectors and first and second fluid transfer connectors.

14. The coupling system according to claim 1, wherein the at least one adjuster unit has an actuating section at which a force acting parallel to an adjusting axis can be introduced into the at least one adjuster unit, where the at least one adjuster unit can be displaced along an adjusting axis.

15. The coupling system according to claim 1, wherein the at least one adjuster unit can only be displaced along an adjusting axis and is otherwise secured against displacement relative to the kingpin or the coupling plate.

16. The coupling system according to claim 15, wherein the adjusting axis is perpendicular to the plug-in axis.

17. The coupling system according claim 15, wherein the guide section has a distal first end and a distal second end offset from the first end parallel to the adjusting axis, and wherein the first end and the second end have an offset relative to each other measured perpendicular to the adjusting axis.

18. The coupling system according to claim 17, wherein the first end and the second end are spaced apart from each other by a guide length measured parallel to the adjusting axis.

19. The coupling system according to claim 17, wherein the first end and/or the second end has/have a detent section.

* * * * *

UNITED STATES PATENT AND TRADEMARK OFFICE
CERTIFICATE OF CORRECTION

PATENT NO. : 11,548,572 B2
APPLICATION NO. : 16/981140
DATED : January 10, 2023
INVENTOR(S) : Mario Sebastian Köster It is certified that error appears in the above-identified patent and that said Letters Patent is hereby corrected as shown below:

In the Specification

Column 2, Line 57:
"guaran-tee" should be – guarantee –

Column 3, Line 14:
"appli-cations" should be – applications –

Column 4, Line 19:
"com-promise" should be – compromise –

Column 4, Line 25:
"end" should be – ends –

Column 5, Line 36:
"combi-nation" should be – combination –

Column 6, Line 6:
"lub-ricant" should be – lubricant –

Column 7, Line 31:
After "side" insert -- view --

Column 7, Line 34:
Delete "with"

Column 7, Line 67:
"not shown." should be – (not shown). –

Signed and Sealed this
Fifth Day of March, 2024

Katherine Kelly Vidal
*Director of the United States Patent and Trademark Office*

CERTIFICATE OF CORRECTION (continued)
U.S. Pat. No. 11,548,572 B2

Column 8, Line 49:
"recognised" should be – recognized –

Column 9, Line 12:
"ele-ments" should be – elements –

Column 9, Line 62:
"re-cessed" should be – recessed –

In the Claims

Column 12, Claim 12, Line 15:
After "according" insert -- to --

Column 12, Claim 14, Line 25:
"where" should be – wherein –

Column 12, Claim 17, Line 33:
After "according" insert -- to --